United States Patent [19]

Wahl

[11] Patent Number: 5,116,285
[45] Date of Patent: May 26, 1992

[54] SUPPORT PLATE AND SPROCKET FOR A ROTATING STACK MECHANISM

[76] Inventor: Colette Wahl, 49, rue de Monceau, 75008 Paris, France

[21] Appl. No.: 555,456
[22] PCT Filed: Feb. 20, 1989
[86] PCT No.: PCT/FR89/00064
   § 371 Date: Aug. 17, 1990
   § 102(e) Date: Aug. 17, 1990
[87] PCT Pub. No.: WO89/07566
   PCT Pub. Date: Aug. 24, 1989

[30] Foreign Application Priority Data

Feb. 19, 1988 [FR] France ............... 88 01976

[51] Int. Cl.$^5$ ............................ F16H 57/02
[52] U.S. Cl. ............................ 474/144
[58] Field of Search .............. 474/144–147, 474/140; 312/267, 268

[56] References Cited

U.S. PATENT DOCUMENTS

| | | | |
|---|---|---|---|
| 3,321,260 | 5/1967 | Anders | 312/268 |
| 3,770,105 | 11/1973 | O'Neal | 198/138 |
| 4,312,550 | 1/1982 | Jackson | 312/268 |
| 4,885,872 | 12/1989 | Chang et al. | 474/144 X |

*Primary Examiner*—Thuy M. Bui
*Attorney, Agent, or Firm*—Dennison, Meserole, Pollack & Scheiner

[57] ABSTRACT

A rotating stack mechanism of small bulkiness and ease of manufacturing comprises cast metal plates 1 with two concentric half-circular stiffening ribs 13, an embossing 2 and shaft 4 located eccentric from the ribs for support of a sprocket wheel 7. The sprocket wheel has a toothed crown 5 and a cavity 6 so formed that the embossing 2 supports the sprocket wheel when pushed against the plate 1 surface. The plates further comprise grooves 12 for embedding a pair of chain guiding sections 10 which operate to entrain chain 8 around the sprocket wheel.

3 Claims, 2 Drawing Sheets

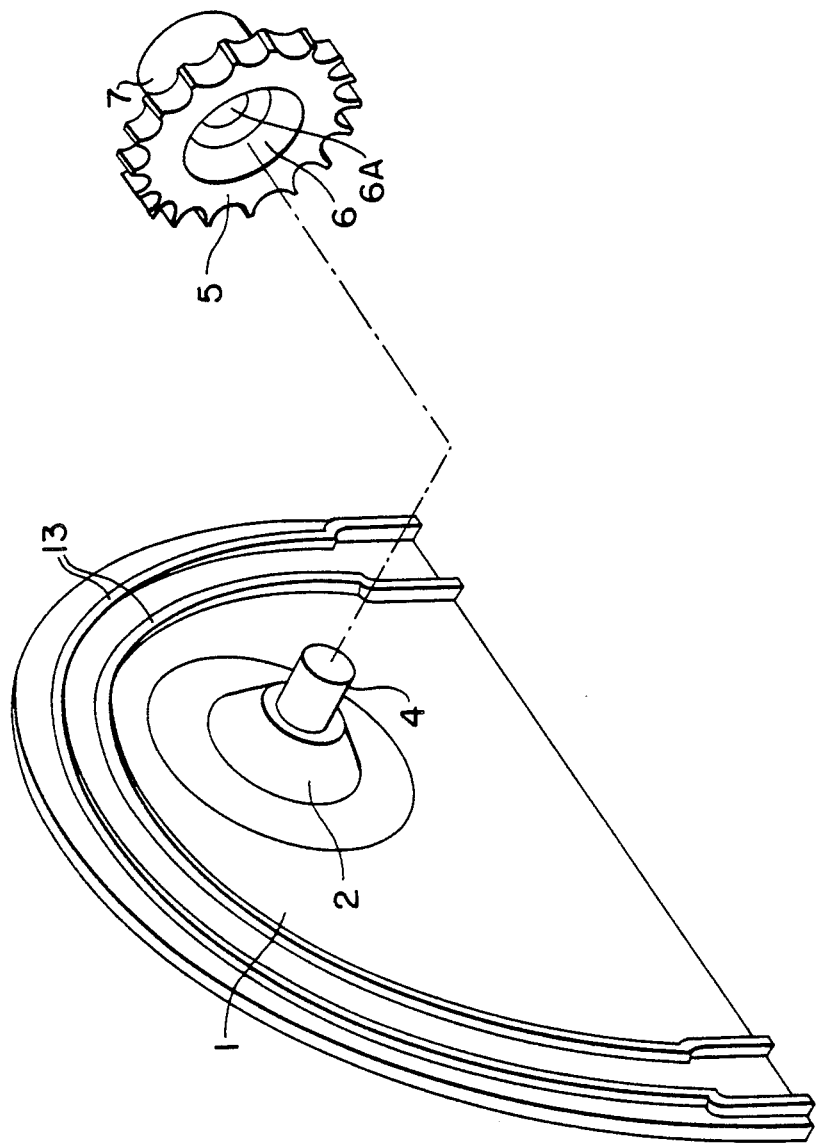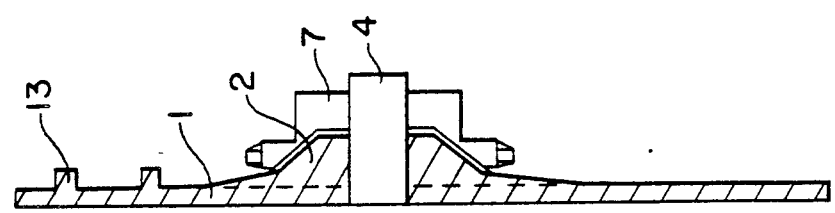

ism, of compact design, suitable for installation in furniture.

SUPPORT PLATE AND SPROCKET FOR A ROTATING STACK MECHANISM

BACKGROUND OF THE INVENTION

This invention relates to a rotating stack mechanism, of compact design, suitable for installation in furniture.

Prior art mechanisms, such as disclosed in U.S. Pat. No. 3,321,260 to Anders, are built of heavy structural units without concern to dimensions, weight or bulkiness.

The structure according to the present invention, enables a considerable reduction in the thickness of the support part by eliminating the necessity of a separate shaft and bearing support structure, couplings for the drive and by arranging the parts so that the chain, by which the stack bearing arms are hanging, can be arranged very close to the mounting surface of the furniture.

SUMMARY OF THE INVENTION

The object of this invention comprises a thin layer of cast metal which is in the form of a half circular disc having two concentric circular shaped ribs operating as stiffeners and having a cone shaped embossing and including a cylindrical shaft for engaging and supporting a sprocket wheel. A complementary conical pair of grooves to both sides of the embossing serve to support sections guiding a chain which is entrained around the sprocket wheel. According to this construction and the ease in molding of the support plate, the invention provides an important saving in weight, bulkiness and manufacturing cost.

BRIEF DESCRIPTION OF THE DRAWINGS

FIG. 1 shows an exploded view of the supporting plate, embossing and the sprocket wheel.

FIG. 2 shows a sectional view of the sprocket wheel in a position close to the supporting plate, mounted on the embossing.

DETAILED DESCRIPTION OF THE EMBODIMENT

Figure 3:
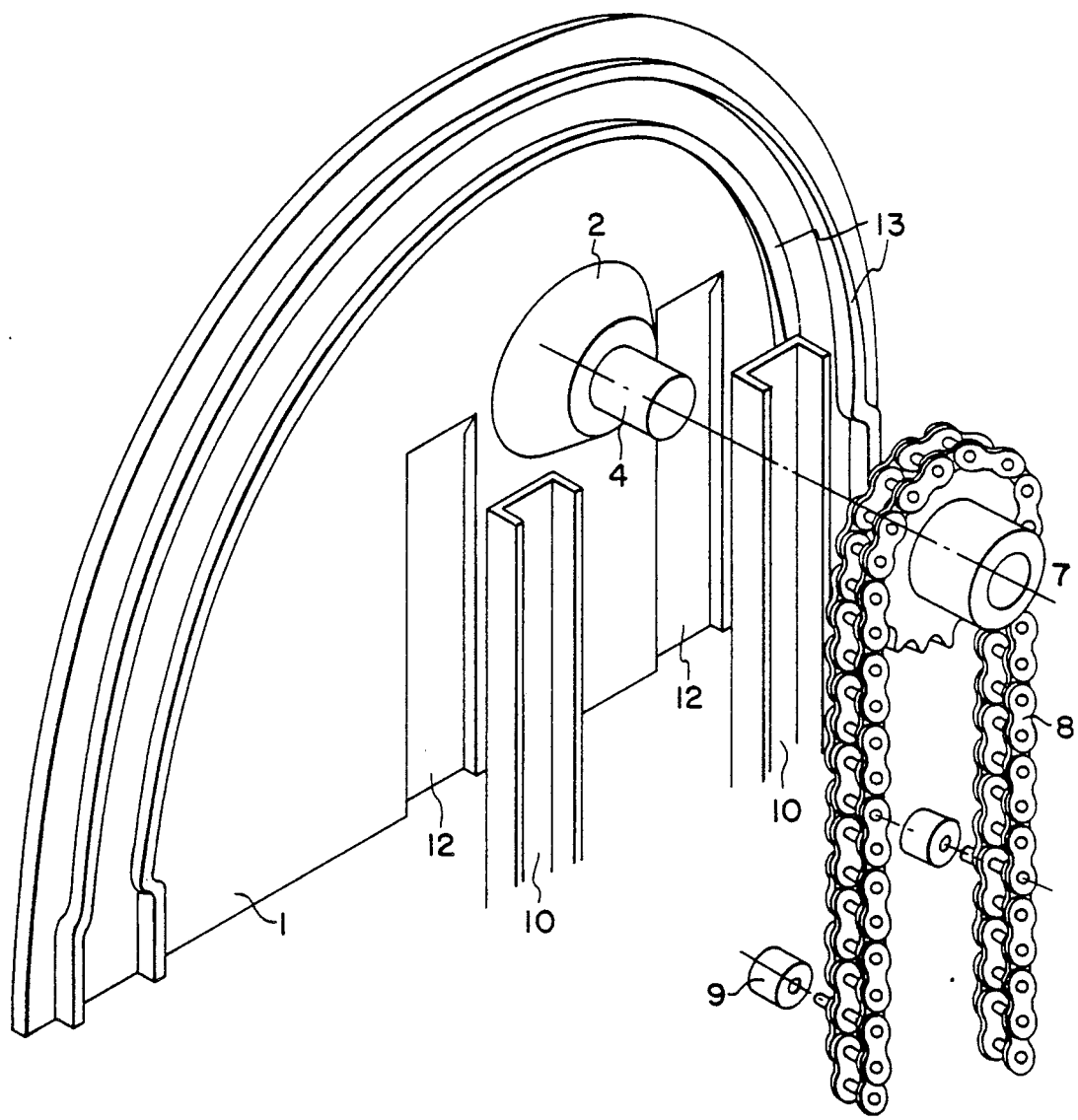
FIG. 3 shows another exploded view including the surface of the supporting plate and the positioning of the parts of one half of the stack mechanism.

FIG. 1 shows in form of an exploded view and FIG. 2 as a sectional view the half circular molded support plate 1, the embossing 2 forming a short cone and shaft 4. Further, two circular concentric ribs 13 operate as stiffeners so that the support plate can be molded as a thin plate. Sprocket wheel 7 has a tooth crown 5, a conical recess and bore 6A with a complementary shape and dimension to enable rotation around shaft 4 and the embossing 2 providing axial support.

FIG. 3 shows the support plate 1 with its two arc-shaped circular ribs 13, its embossing 2 being eccentric from said circular ribs and a pair of parallel grooves 12 as well as the pair of chain guide sections 10 which are embedded in the grooves The sections 10 cover the chain 8 and guide it with rollers 9 having a bore supported by small studs inserted between the chain links.

I claim:

1. For a rotating stack mechanism, a cast metal plate for supporting a toothed sprocket wheel and a pair of vertical chain guide sections, comprising:

a thin molded disc of half-circular shape having two concentric, circular shaped stiffening ribs, a cone-shaped embossing including a cylindrical shaft for supporting a toothed sprocket wheel, parallel grooves for embedding a pair of vertical chain guide sections, said grooves being located on each side of the cone-shaped embossing.

2. The plate according to claim 1 wherein said toothed sprocket wheel includes a centrally located conical recessed portion and a bore portion complementary to said cone-shaped embossing and cylindrical shaft, said toothed sprocket wheel is rotatably mounted thereon and said cone-shaped portion providing axial support.

3. The plate according to claim 1 wherein a chain is entrained around said toothed sprocket wheel and between said pair of vertical guide sections.

* * * * *